United States Patent [19]

Altrock et al.

[11] 4,366,180

[45] Dec. 28, 1982

[54] PROCESS FOR PRODUCING A LOW-FAT OIL-IN-WATER-IN-OIL EMULSION

[75] Inventors: Werner W. L. Altrock; Janis A. Ritums, both of Lidingö, Sweden

[73] Assignee: Lever Brothers Company, New York, N.Y.

[21] Appl. No.: 262,837

[22] Filed: May 12, 1981

[30] Foreign Application Priority Data

May 21, 1980 [NL] Netherlands ............... 8002925

[51] Int. Cl.$^3$ .................... A23D 3/02; A23D 5/02
[52] U.S. Cl. .................... 426/602; 426/603; 426/613
[58] Field of Search ............... 426/602, 603, 604, 613

[56] References Cited

U.S. PATENT DOCUMENTS

| | | | |
|---|---|---|---|
| 2,357,896 | 9/1944 | Howe | 426/603 X |
| 2,937,093 | 5/1960 | Gorman et al. | 426/603 X |
| 2,970,917 | 2/1961 | Melnick | 426/603 X |
| 3,245,802 | 4/1966 | Pardun | 426/604 |
| 3,490,919 | 1/1970 | Moran | 426/604 X |
| 3,917,859 | 11/1975 | Terada et al. | 426/602 |
| 3,946,122 | 3/1976 | Scharp | 426/604 |
| 4,209,546 | 6/1980 | Johansson | 426/603 |

FOREIGN PATENT DOCUMENTS 1160470 7/1969 United Kingdom .

*Primary Examiner*—Robert A. Yoncoskie
*Attorney, Agent, or Firm*—Milton L. Honig; James J. Farrell

[57] ABSTRACT

A process for producing a low-fat oil-in-water-in-oil emulsion, particularly a low-fat spread, comprising (a) feeding the fatty phase which constitutes the continuous phase of the final emulsion into a system comprising an emulsification unit and units where cooling and working are carried out for a period of time long enough to at least achieve coating of the inner surface of said emulsification unit with said fatty phase and preferably for a period of time long enough to remove substantially all the air present in the emulsification unit, and (b) introducing in the system increasing amounts of a proteinaceous oil-in-water emulsion which is preferably substantially free of gas dissolved therein, until the desired concentration of fat in the end product is obtained. The fatty phase and the proteinaceous emulsion are preferably fed into the emulsification unit as concentric streams whereby the fatty phase constitutes the outer stream and the proteinaceous emulsion constitutes the inner stream.

13 Claims, No Drawings

PROCESS FOR PRODUCING A LOW-FAT OIL-IN-WATER-IN-OIL EMULSION

The invention relates to a process for producing a low-fat oil-in-water-in-oil emulsion and particularly a low-fat spread wherein the continuous phase of the emulsion consists of fat and the dispersed phase of the emulsion comprises water with fat and protein dispersed therein. In other words, the invention relates to an oil-in-water-in-oil emulsion, referred to in the literature by the term double emulsion.

By low-fat oil-in-water-in-oil emulsions is meant throughout the specification oil-in-water-in-oil emulsions containing less than 65 wt.% and preferably 20 to 50 wt.% fat; by the term fat is to be understood oils which are liquid at room temperature as well as hard fats.

It is known from British Patent Specification 1,564,400 to produce a low-fat oil-in-water-in-oil emulsion and particularly a low-fat spread according to a process comprising:

(a) producing an oil-in-water emulsion starting from water, proteins and fat;

(b) mixing the oil-in-water emulsion with a fatty phase, and (c) subjecting the mixture thus obtained to a cooling and working treatment under conditions leading to a spread having the desired plasticity.

During the production of such low-fat spreads the technician is confronted with the problem of phase inversion, which means that instead of a fat continuous emulsion a water continuous emulsion is obtained.

This is in itself not surprising in view of the relatively high levels of water involved, but is highly undesirable because of bacteriological hazards associated with emulsions having water as the continuous phase. It is therefore an object of the present invention to provide low-fat spreads having both a good appearance and good organoleptic properties. In other words, it is an object of the present invention to provide a low-fat oil-in-water-in-oil emulsion which is stable both during processing and on storage, which means that the final product should not display exudation of either of the constituent phases of the emulsion or phase inversion. On the other hand, the emulsion should not be too stable in the mouth, which means that, under the conditions prevailing in the mouth, adequate release of flavours from the dispersed aqueous phase should be allowed to occur.

It is another object of the present invention to provide an efficient and economical process for producing said low-fat spreads.

Applicants have found that the objects of this invention can be realized by applying judicious process conditions based on the discovery of critical factors controlling the stability of the emulsions.

The process according to the invention for producing low-fat spreads generally corresponds to the procedure followed in the process of the prior art as outlined in the sequential steps (a), (b) and (c) described above, but comprises refinements allowing a reproducible preparation of spreads of the desired quality with a minimum of wastage.

Applicants have found that stable oil-in-water-in-oil emulsions containing less than 65% fat can be obtained according to a process comprising the steps (a), (b) and (c) as outlined above, which process is characterized in that (a) in the earliest stage of the process only the fatty phase which constitutes the continuous phase of the emulsion is fed into a system comprising an emulsification unit and units where cooling and working are carried out for a period of time long enough to at least achieve coating of the inner surface of the emulsification unit with said fatty phase, (b) increasing amounts of the proteinaceous oil-in-water emulsion are subsequently gradually introduced into the system until the desired concentration of fat in the end product is obtained.

Preferably the process is carried out in such a way that in its earliest stage only the fatty phase is pumped through the system for a period of time such that a sample drawn from the emulsification unit is substantially free from air bubbles. It is believed that coating of the inner surface of at least the emulsification unit prevents the occurrence of phase inversion and that removing the air present in the system promotes the stability of the emulsion.

According to a preferred embodiment of the process of the present invention, the fatty phase which constitutes the continuous phase of the emulsion and the oil-in-water emulsion which constitutes the dispersed phase of the emulsion are fed into the emulsification unit in the form of concentric streams wherein the oil-in-water emulsion is the inner stream and the fatty phase is the outer stream.

It is believed that such a way of performing the process promotes obtaining the right type of emulsion and that this effect is probably due to incapsulation of the oil-in-water emulsion in the fatty phase.

In the process according to the invention, proportioning of the oil-in-water emulsion constituting the dispersed phase of the final low-fat oil-in-water-in-oil emulsion or spread is performed under conditions such that excessive shear is avoided, so as to prevent phase inversion and to keep sensitive structures in the emulsion intact. This is best achieved by allowing the oil-in-water emulsion to be conducted under controlled flow, e.g. under influence of gravity and using valve-free pumps, into an emulsification unit where it is mixed with the fatty phase which forms the continuous phase of the final low-fat oil-in-water-in-oil emulsion or spread.

Applicants have found that the instability of low-fat oil-in-water-in-oil emulsions, resulting in complete or partial phase inversion, was at least partly caused by the presence of gas (e.g. $CO_2$, $O_2$) dissolved in the water used for the preparation of the aqueous phase of the water-in-oil emulsion. It is therefore an important feature of the present invention to produce a low-fat, proteinaceous aqueous phase using deaerated water. The aqueous phase of the low-fat water-in-oil emulsions or spreads produced according to the invention (vide step (a) described above) is present in the form of an oil-in-water emulsion substantially free of gas dissolved therein, and may contain, besides the components already mentioned, flavouring components, hydrocolloids, buffering salts, etc. The oil-in-water emulsion constituting the dispersed phase of the final low-fat oil-in-water-in-oil emulsions is produced using water which has been deaerated preferably by heating it to a temperature ranging from 60° to 95° C., preferably 70° to 90° C., under subatmospheric pressure preferably ranging from 50 to 150 millibars.

According to a preferred embodiment of the present invention the oil-in-water emulsion constituting the aqueous phase of the final low-fat oil-in-water-in-oil emulsion is produced by (i) deaerating the amount of water necessary to produce said oil-in-water emulsion, then (ii) dissolving in the water an appropriate proportion of protein, subsequently (iii) deaerating the proteinaceous solution, and finally (iv) introducing the appropriate amount of fat.

This procedure, involving 2 deaeration steps, has given very satisfactory results. It is, however, possible and in some cases sufficient to perform step (iii) while omitting step (i). The procedure involving 2 deaeration steps is extremely efficient in removing gas dissolved in the water and gas occluded in the protein which is usually added to the water in powder form.

Applicants have further found that it was extremely beneficial to the stability of the final product to re-melt a small proportion of the product obtained in step (c) and subject it again to the cooling and working treatment of step (c). Preferably 5 to 20 wt.% of the product is melted by heating it at 40° to 60° C. and is reworked and cooled. For obtaining oil-in-water-in-oil emulsions having optimal properties it is recommendable to produce the oil-in-water emulsion constituting the aqueous phase of the final emulsion or spread, with some care.

Applicants have found that the viscosity of said oil-in-water emulsion contributes to the stability of the final oil-in-water-in-oil emulsion. The viscosity should preferably be at least 400 mPa.s at 50° C. or at least 2000 mPa.s at 22° C. (measured in a Haake Rotovisko viscosimeter). The desired viscosity is achieved by incorporating an appropriate proportion of proteins, and possibly other additives such as hydrocolloids or salts. Useful proportions of proteins may vary from 0.2 to 12 wt.%, preferably 2 to 8 wt.% based on the total emulsion. The proteins may consist of vegetable protein such as a soya protein isolate, cottonseed protein, rapeseed protein etc. or of an animal protein such as milk proteins. Preferably casein is used in the form of sodium caseinate.

In order to achieve the desired viscosity it is important that the protein is predominantly present in the dissolved state in the aqueous phase. In order to dissolve or disperse the protein efficiently, it was found recommendable to add all or practically all the protein in powder form to the water and then to stir vigorously. The advantages of this procedure are that practically no foaming occurs, dissolution is rapid and consequently the taste of the final product is satisfactory.

The water in which the protein is dissolved usually contains buffering salts used to keep the emulsion at a pH ranging from 5.0 to 7.0 and preferably 5.0 to 6.5.

Another factor contributing to a stable product is the size of the fat droplets present in the oil-in-water emulsion produced in step (a). The particle size of the dispersed fat is preferably between 1 and 30 microns, and the average particle size ranges from 3 to 10 microns. This is useful when artificial cream is used. Said droplet size can be achieved by using a suitable mill whereby the setting of the mill is determined on microscopic examination of the emulsion. The fat used for producing the proteinaceous oil-in-water emulsion can be a fat having the same characteristics as the fat used as the fatty phase and is preferably a plastic margarine fat having a dilatation value at 10° C. of 100 to 1000 $mm^3/25$ g. It is also possible that for producing the proteinaceous oil-in-water emulsion a fat is used which is substantially liquid at 5° C.

The fat dispersed in the proteinaceous oil-in-water emulsion can be in the form of either artificial cream or natural cream. The proportion of fat used in the oil-in-water emulsion is 1 to 20 wt.%, preferably 2 to 10 wt.% based on the total weight of the final oil-in-water-in-oil emulsion.

In the process according to the invention working and cooling are preferably carried out in a series of surface-scraped heat exchangers and resting tubes whereby the temperature decreases from about 48° C. in the first unit to about 12° C. in the last unit. The type of apparatus used is similar to that disclosed in Andersen & Williams "Margarine", 1964.

The invention will now be illustrated in the following Examples.

EXAMPLE 1

Deaerated water was produced by heating tap water to 90° C. under a pressure of 150 millibars. An aqueous phase (oil-in-water emulsion) was prepared by first dissolving potassium sorbate (0.12%), citric acid (0.12%), disodium phosphate $Na_2HPO_4.2H_2O$ (0.24%), sodium chloride (1.94%) in deaerated water cooled to 60° C. (40.54%) based on the total composition.

To the solution thus obtained sodium caseinate (8.03%) was added. After all the sodium caseinate was added, high-energy stirring was applied for a period long enough to solubilize the protein.

The protein solution was then deaerated again under a pressure of 80 to 100 millibars at a temperature of about 60° C. in a vessel where the solution was constantly projected against the walls to form a liquid film.

To the deaerated protein solution was added pasteurized, cultured dairy cream (15 wt.% based on the total composition) containing 40% fat. The oil-in-water emulsion had a pH of about 6.0.

A fat phase was prepared containing a fat blend (33.8 wt.% based on the total composition) consisting of sunflower oil, cotton-seed oil, coconut fat and interesterified, hardened coconut fat and soya bean oil. To the fat blend were further added 0.2 wt.% emulsifier. This fat phase was pumped through the system comprising an emulsification unit and surface-scraped heat exchangers, until a sample taken from the emulsification unit was free of air bubbles. Subsequently a gradually increasing proportion of the oil-in-water emulsion was fed together with the fat phase through concentric pipes into an emulsification unit, while allowing the aqueous phase to flow under controlled conditions and through valve-free pumps so as to avoid destroying the structure of the fat globules in the oil-in-water emulsion. The fat phase was fed to the emulsification unit through the outer pipe while the aqueous phase was fed through the inner pipe.

An oil-in-water-in-oil emulsion was produced by mixing the fat phase with the oil-in-water emulsion in the emulsification unit.

The type of the continuous phase (oil or water) was monitored by conductivity measurements (a high conductivity corresponds to the formation of an oil-in-water emulsion).

The oil-in-water-in-oil emulsion obtained was subsequently pasteurized for 15 seconds at 90° C. and then fed into a series of surface-scraped heat exchangers whereby the temperature decreased from about 48° C. in the first heat exchanger to about 12° C. in the last.

The oil-in-water-in-oil emulsion (spread) obtained was then packed in plastic tubs.

The product obtained, assessed by a panel, had excellent organoleptic properties and did not display exudation on storage.

EXAMPLE 2

The procedure of Example 1 was repeated with the exception that 10% of the material leaving the series of heat exchangers was re-melted and re-fed into the series of surface-scraped heat exchangers. The product obtained, as assessed by a panel, had excellent organoleptic properties and did not display exudation on storage.

We claim:

1. A process for producing an edible low-fat oil-in-water-in-oil emulsion spread containing less than 65 wt.% fat, comprising:
   (a) feeding a fat constituting the continuous phase of the emulsion into an emulsification unit and units where cooling and working are carried out for a period of time long enough to at least achieve coating of the inner surface of the emulsification unit with said fatty continuous phase;
   (b) preparing a proteinaceous oil-in-water emulsion from water, proteins and fat;
   (c) deaerating said proteinaceous oil-in-water emulsion;
   (d) forming a mixture of the fatty continuous phase with the proteinaceous oil-in-water emulsion by gradually introducing said phase and emulsion into said coated emulsification unit; and
   (e) subjecting said mixture to a cooling and working treatment.

2. A process according to claim 1, wherein said step (a) is carried out until substantially all the air present in the emulsification unit has been removed.

3. A process according to claim 1, wherein said proteinaceous oil-in-water emulsion and the fatty phase are fed into the emulsification unit in the form of concentric streams whereby the fatty phase constitutes the outer stream and the oil-in-water emulsion constitutes the inner stream.

4. A process according to claim 1, wherein said proteinaceous oil-in-water emulsion is fed into the emulsification unit under the influence of gravity and using a valve-free pump.

5. A process according to claim 1, wherein said proteinaceous oil-in-water emulsion is used in which the aqueous phase is substantially free of gas dissolved therein.

6. A process according to claim 5, wherein said proteinaceous oil-in-water emulsion is used which has been produced by
   (i) deaerating water,
   (ii) dissolving protein in the deaerated water,
   (iii) deaerating the proteinaceous solution,
   (iv) incorporating in the proteinaceous solution the appropriate proportion of fat.

7. A process according to claim 6, wherein said deaeration is carried out by heating at 60° to 95° C. under subatmospheric pressure.

8. A process according to claim 1, wherein said 5 to 20 wt.% of the final oil-in-water-in-oil emulsion is re-melted, fed into the emulsification unit and subjected to the cooling and working treatment.

9. A process according to claim 1, in which a low-fat spread is produced which contains 20 to 50 wt.% fat.

10. A process according to claim 1, in which 0.2 to 12 wt.% protein is incorporated in the oil-in-water emulsion.

11. A process according to claim 1, in which the fatty phase which forms the continuous phase of the final oil-in-water-in-oil emulsion, contains a plastic margarine fat.

12. A process according to claim 11, in which the fatty phase consists of a fat having a dilatation value at 10° C. of 100 to 1000 mm$^3$/25 g.

13. A process according to claim 1, in which the proportion of fat present in the proteinaceous oil-in-water emulsion ranges from 1 to 20 wt.% based on the total emulsion.

* * * * *